US012142795B2

(12) United States Patent
Zhu et al.

(10) Patent No.: US 12,142,795 B2
(45) Date of Patent: Nov. 12, 2024

(54) TOP PRESSING PLATE, SECONDARY BATTERY AND METHOD FOR MANUFACTURING SECONDARY BATTERY

(71) Applicant: CONTEMPORARY AMPEREX TECHNOLOGY (HONG KONG) LIMITED, Hong Kong (CN)

(72) Inventors: Baojian Zhu, Ningde (CN); Lei Chen, Ningde (CN); Shoujiang Xu, Ningde (CN); Chunyan Feng, Ningde (CN)

(73) Assignee: Contemporary Amperex Technology (HONG KONG) Limited, Hong Kong (CN)

( * ) Notice: Subject to any disclaimer, the term of this patent is extended or adjusted under 35 U.S.C. 154(b) by 26 days.

(21) Appl. No.: 16/964,318

(22) PCT Filed: Oct. 15, 2019

(86) PCT No.: PCT/CN2019/111200
§ 371 (c)(1),
(2) Date: Jul. 23, 2020

(87) PCT Pub. No.: WO2020/088239
PCT Pub. Date: May 7, 2020

(65) Prior Publication Data
US 2021/0043912 A1    Feb. 11, 2021

(30) Foreign Application Priority Data
Oct. 30, 2018    (CN) .......................... 201811278761.8

(51) Int. Cl.
*H01M 50/54*        (2021.01)
*H01M 10/0585*    (2010.01)
(Continued)

(52) U.S. Cl.
CPC ....... *H01M 50/54* (2021.01); *H01M 10/0585* (2013.01); *H01M 50/176* (2021.01);
(Continued)

(58) Field of Classification Search
CPC .. H01M 50/54; H01M 50/579; H01M 50/383; H01M 10/0585
See application file for complete search history.

(56) References Cited

U.S. PATENT DOCUMENTS

2014/0186692 A1\* 7/2014 Kim et al. ........ H01M 10/0422
429/185
2016/0049635 A1  2/2016 Park et al.
(Continued)

FOREIGN PATENT DOCUMENTS

CN    102856523 A    1/2013
CN    205543009 U    8/2016
(Continued)

OTHER PUBLICATIONS

PCT International Search Report for PCT/CN2019/111200, dated Jan. 17, 2020, 12 pages.
(Continued)

*Primary Examiner* — Matthew T Martin
*Assistant Examiner* — Alexandra J Simmons
(74) *Attorney, Agent, or Firm* — East IP P.C.

(57) ABSTRACT

This application relates to a top pressing plate, a secondary battery, and a method for manufacturing a secondary battery. The top pressing plate is used for a secondary battery, the secondary battery including a top cover sheet, an insulating separator and an electrode assembly, the electrode assembly including a main body portion and electrode tabs connected to the main body portion, the electrode tabs each including a welding end portion, the top pressing plate includes: a first surface and a second surface provided oppositely in a (Continued)

thickness direction of the top pressing plate and an accommodating groove recessed from the second surface toward the first surface, the top pressing plate can be provided between the insulating separator and the main body portion, the first surface faces the main body portion, the second surface faces the insulating separator, and the accommodating groove is disposed to accommodate the welding end portion.

16 Claims, 6 Drawing Sheets

(51) Int. Cl.
  *H01M 50/176* (2021.01)
  *H01M 50/383* (2021.01)
  *H01M 50/579* (2021.01)
  *H01M 50/147* (2021.01)

(52) U.S. Cl.
  CPC ....... *H01M 50/383* (2021.01); *H01M 50/579* (2021.01); *H01M 50/147* (2021.01)

(56) References Cited

U.S. PATENT DOCUMENTS

| | | | |
|---|---|---|---|
| 2016/0099444 A1* | 4/2016 | Park et al. | H01M 50/566 429/82 |
| 2016/0336574 A1 | 11/2016 | Guen et al. | |
| 2017/0133655 A1* | 5/2017 | Guen et al. | H01M 10/0525 |
| 2018/0114954 A1* | 4/2018 | Lee | H01M 50/543 |
| 2018/0351153 A1 | 12/2018 | Nakamura et al. | |

FOREIGN PATENT DOCUMENTS

| | | |
|---|---|---|
| CN | 106684267 A | 5/2017 |
| CN | 206210861 U | 5/2017 |
| CN | 206250229 U | 6/2017 |
| CN | 206742372 U | 12/2017 |
| CN | 107968182 A | 4/2018 |
| CN | 207233788 U | 4/2018 |
| CN | 107978699 A | 5/2018 |
| CN | 207381439 U | 5/2018 |
| CN | 108428820 A | 8/2018 |
| CN | 108428821 A | 8/2018 |
| CN | 207690876 U | 8/2018 |
| CN | 207818736 U | 9/2018 |
| EP | 2079126 A1 | 7/2009 |
| EP | 3168896 A2 | 5/2017 |
| WO | 2017110548 A1 | 6/2017 |

OTHER PUBLICATIONS

The First Office Action and search report dated Jul. 21, 2020 for Chinese Application No. 201811278761.8, 10 pages.
The second Office Action and search report dated Oct. 13, 2020 for Chinese Application No. 201811278761.8, 9 pages.
The extended European search report for European Application No. 19878366.4 dated Mar. 5, 2021, 7 pages.

* cited by examiner

FIG. 6 placing a top cap assembly at a predetermined assembly station, the top cap assembly comprising a top cap sheet and an insulating separator connected to the top cap sheet assembling the top cap assembly and an electrode assembly, the electrode assembly comprising a main body portion and electrode tabs connected to the main body portion, the electrode tabs each comprising a connecting end portion, a welding end portion, and a middle section connecting the connecting end portion with the welding end portion, the connecting end portion being connected with the main body portion, and connecting the welding end portion with the top cap assembly by welding, the welding end portion being insulated from the top cap sheet through the insulating separator assembling a top pressing plate, the top pressing plate comprising a first surface, a second surface, and an accommodating groove recessed from the second surface toward the first surface, covering the welding end portion by the top pressing plate, and then adjusting the position of the electrode assembly, so that the top pressing plate is located between the insulating separator and the main body portion, the first surface faces the main body portion, the second surface faces the insulating separator, and the welding end portion is accommodated in the accommodating groove

FIG. 7

TOP PRESSING PLATE, SECONDARY BATTERY AND METHOD FOR MANUFACTURING SECONDARY BATTERY

CROSS-REFERENCE TO RELATED APPLICATIONS

This application is National Stage of International Application No. PCT/CN2019/111200, filed on Oct. 15, 2019, which claims priority to Chinese Patent Application No. 201811278761.8 entitled "SECONDARY BATTERY" and filed on Oct. 30, 2018, both of which are incorporated herein by reference in its entirety.

TECHNICAL FIELD

The present disclosure relates to the field of battery, and in particular, to a top pressing plate, a secondary battery, and a method for manufacturing the secondary battery.

BACKGROUND

The secondary battery generally includes an electrode assembly, a case, and a top cover assembly. The electrode assembly is formed by winding a positive electrode sheet, a negative electrode sheet, and an isolating film provided between the positive electrode sheet and the negative electrode sheet about a winding axis. An active material of the positive electrode sheet is coated on a coated region of the positive electrode sheet, and an active material of the negative electrode sheet is coated on a coated region of the negative electrode sheet. A plurality of uncoated regions extending from the coated regions of a main body are stacked to form electrode tabs, and the electrode assembly includes two electrode tabs, namely, a positive electrode tab extending from the coated region of the positive electrode sheet and a negative electrode tab extending from the coated region of the negative electrode sheet. The electrode assembly is housed in the case, and the top cover assembly is assembled with the case and provided corresponding to an end portion of the electrode assembly in the winding axis. The top cover assembly includes a top cover sheet and electrode terminals provided on the top cover sheet, wherein the electrode tabs of the electrode assembly are electrically connected with the electrode terminals of the top cover assembly. However, the secondary battery may vibrate during use, thereby causing the electrode assembly to move in the case and the electrode tabs to be bent repeatedly. In this way, the electric tabs are susceptible to breakage after being bent repeatedly.

SUMMARY

Embodiments of the present disclosure provides a top pressing plate, a secondary battery, and a method for manufacturing a secondary battery. When applied to the secondary battery, the top pressing can press against a main body portion, so as to limit the position of the main body portion in the case and effectively restrain the movement of the main body portion in the case, thereby preventing the electrode tabs from being bent and broken which is caused due to the movement of the main body portion.

In one aspect, an embodiment of the present disclosure provides a top pressing plate which is used for a secondary battery, the secondary battery including a top cover sheet, an insulating separator connected to the top cover sheet, and an electrode assembly, the electrode assembly including a main body portion and electrode tabs connected to the main body portion, the electrode tabs each including a welding end portion, wherein the top pressing plate includes: a first surface and a second surface provided oppositely in a thickness direction of the top pressing plate and an accommodating groove recessed from the second surface toward the first surface, the top pressing plate can be provided between the insulating separator and the main body portion, the first surface faces the main body portion, the second surface faces the insulating separator, and the accommodating groove is disposed to accommodate the welding end portion.

According to an aspect of the embodiment of the present disclosure, the accommodating groove penetrates the top pressing plate in a width direction of the top pressing plate.

According to an aspect of the embodiment of the present disclosure, the top pressing plate includes a first boss, the number of the accommodating groove is two, and two accommodating grooves are respectively provided on both sides of the first boss in a length direction of the top pressing plate.

When applied to the secondary battery, the top pressing plate according to the embodiment of the present disclosure is provided between the top cover sheet and the main body portion of the electrode assembly. The top pressing plate can press against the main body portion, so as to limit the position of the main body in the case, effectively restrain the movement of the main body portion in the case and further prevent the electrode tabs from being bent and broken which is caused due to the movement of the main body portion, thereby improving the use safety of secondary battery. Moreover, the welding end portions of the electrode tabs are isolated to the main body portion by the top pressing plate, so as to prevent the welding region of the welding end portion from scratching or abrading the main body portion.

In another aspect, an embodiment of the present disclosure provides a secondary battery including: an electrode assembly, the electrode assembly including a main body portion and electrode tabs connected to the main body portion, the electrode tabs each including a connecting end portion, a welding end portion, and a middle section connecting the connecting end portion and the welding end portion, the connecting end portion being connected to the main body portion; a top cover assembly, the top cover assembly including a top cover sheet and an insulating separator connected to the top cover sheet; and a top pressing plate, the top pressing plate provided between the insulating separator and the main body portion, the top pressing plate including a first surface facing the main body portion, a second surface facing the insulating separator, and an accommodating groove recessed from the second surface toward the first surface, the welding end portion being accommodated in the accommodating groove.

According to another aspect of the embodiment of the present disclosure, the accommodating groove penetrates the top pressing plate in a width direction of the top cover sheet.

According to another aspect of the embodiment of the present disclosure, a depth of the accommodating groove is greater than or equal to a thickness of the welding end portion in a thickness direction of the top cover sheet.

According to another aspect of the embodiment of the present disclosure, the top pressing plate includes a first boss, the number of the accommodating groove is two, and two accommodating grooves are respectively provided on both sides of the first boss in a length direction of the top cover sheet.

According to another aspect of the embodiment of the present disclosure, the insulating separator includes a first insulator and a second insulator, the first insulator and the second insulator are spaced apart from each other in the length direction to form an avoidance gap, and the first boss is provided corresponding to the avoidance gap.

According to another aspect of the embodiment of the present disclosure, the first insulator and the second insulator each includes a second boss, the second boss abuts against a bottom of corresponding one of the two accommodating grooves and a thickness of the second boss is greater than or equal to the depth of corresponding one of the two accommodating grooves.

According to another aspect of the embodiment of the present disclosure, the top cover assembly further includes an explosion-proof valve, the explosion-proof valve provided on the top cover sheet and corresponding to the first boss, the first boss including an overflow hole corresponding to the explosion-proof valve.

According to another aspect of the embodiment of the present disclosure, the insulating separator includes an accommodating recess recessed away from the main body portion, and the top pressing plate and the welding end portion are both accommodated in the accommodating recess.

According to another aspect of the embodiment of the present disclosure, the secondary battery further includes an adapter sheet, the adapter sheet has a flat plate shape, the welding end portion is connected with the adapter sheet by welding, and the adapter sheet is at least partially accommodated in the accommodating groove.

According to another aspect of the embodiment of the present disclosure, the top pressing plate includes a first engaging portion, the insulating separator includes a second engaging portion, and the first engaging portion is engaged with the second engaging portion, and wherein one of the first engage portion and the second engaging portion is an engaging hole, and the other thereof is an engaging leg.

In a further aspect, an embodiment of the present disclosure provides a method for manufacturing a secondary battery including:
placing a top cover assembly at a predetermined assembly station, the top cover assembly including a top cover sheet and an insulating separator connected to the top cover sheet;
assembling the top cover assembly and an electrode assembly, the electrode assembly including a main body portion and electrode tabs connected to the main body portion, the electrode tabs each including a connecting end portion, a welding end portion, and a middle section connecting the connecting end portion and the welding end portion, the connecting end portion being connected with the main body portion, and connecting the welding end portion with the top cover assembly by welding, the welding end portion being insulated from the top cover sheet through the insulating separator; and
assembling a top pressing plate, the top pressing plate including a first surface, a second surface, and an accommodating groove recessed from the second surface toward the first surface, covering the welding end portion by the top pressing plate, and then adjusting the position of the electrode assembly, so that the top pressing plate is located between the insulating separator and the main body portion, the first surface faces the main body portion, the second surface faces the insulating separator, and the welding end portion is accommodated in the accommodating groove.

BRIEF DESCRIPTION OF THE DRAWINGS

The features, advantages, and technical effects of exemplary embodiments of the present disclosure will be described below with reference to the drawings.

In the drawings, the drawings are not drawn to actual scale.

DESCRIPTION OF THE SYMBOLS

10—case;
20—electrode assembly; 201—main body portion; 202—electrode tab; 202*a*—connecting end portion; 202*b*—middle section; 202*c*—welding end portion;
30—adapter sheet;
40—top cover assembly; 401—top cover sheet; 402—electrode terminals; 403—insulating separator; 403*a*—first insulator; 403*b*—second insulator; 403*c*—avoidance gap; 403*d*—accommodating recess; 403*e*—lower surface; 403*f*—second engaging portion; 403*g*—second boss; 404—explosion-proof valve;
50—top pressing plate; 501—first surface; 502—second surface; 503—first end portion; 504—second end portion; 505—accommodating groove; 506—first boss; 506*a*—overflow hole; 507—side surface; 508—the first engaging portion;
X—length direction; Y—thickness direction; Z—width direction.

DETAILED DESCRIPTION

The embodiments of the present disclosure will be further described in detail below in conjunction with the drawings and embodiments. The detailed description of the following embodiments and the drawings are intended to illustrate the principle of the disclosure but are not intended to limit the scope of the disclosure, i.e., the present disclosure is not limited to the described embodiments.

In the description of the present disclosure, it should be noted that, unless otherwise stated, the meaning of "a plurality of" is two or more; the terms "up", "down", "left", "right", "inside", "outside", and the like indicating the orientation or positional relationship are merely for facilitating and simplifying the description of the present disclosure, and do not indicate or imply that the involved device or element must have the specific orientation or must be configured and operated in a specific orientation, and therefore, should not be construed as a limitation to the disclosure. Moreover, the terms "first", "second", and the like are only used for the purpose of description, and should not be construed as indicating or implying relative importance.

In the description of the disclosure, it should also be noted that, unless otherwise specified and limited, the terms "installation", "connected with", and "connected" should be understood broadly, for example, it may be fixed connection, detachable connection, or integral connection; it may be direct connection or indirect connection through an intermediate medium. The specific meaning of the above terms in the present application may be understood by the skilled in the art based on specific situation.

In order to better understand the present disclosure, a secondary battery according to an embodiment of the present disclosure will be described in detail below with reference to FIGS. 1 to 7.

Figure 1:
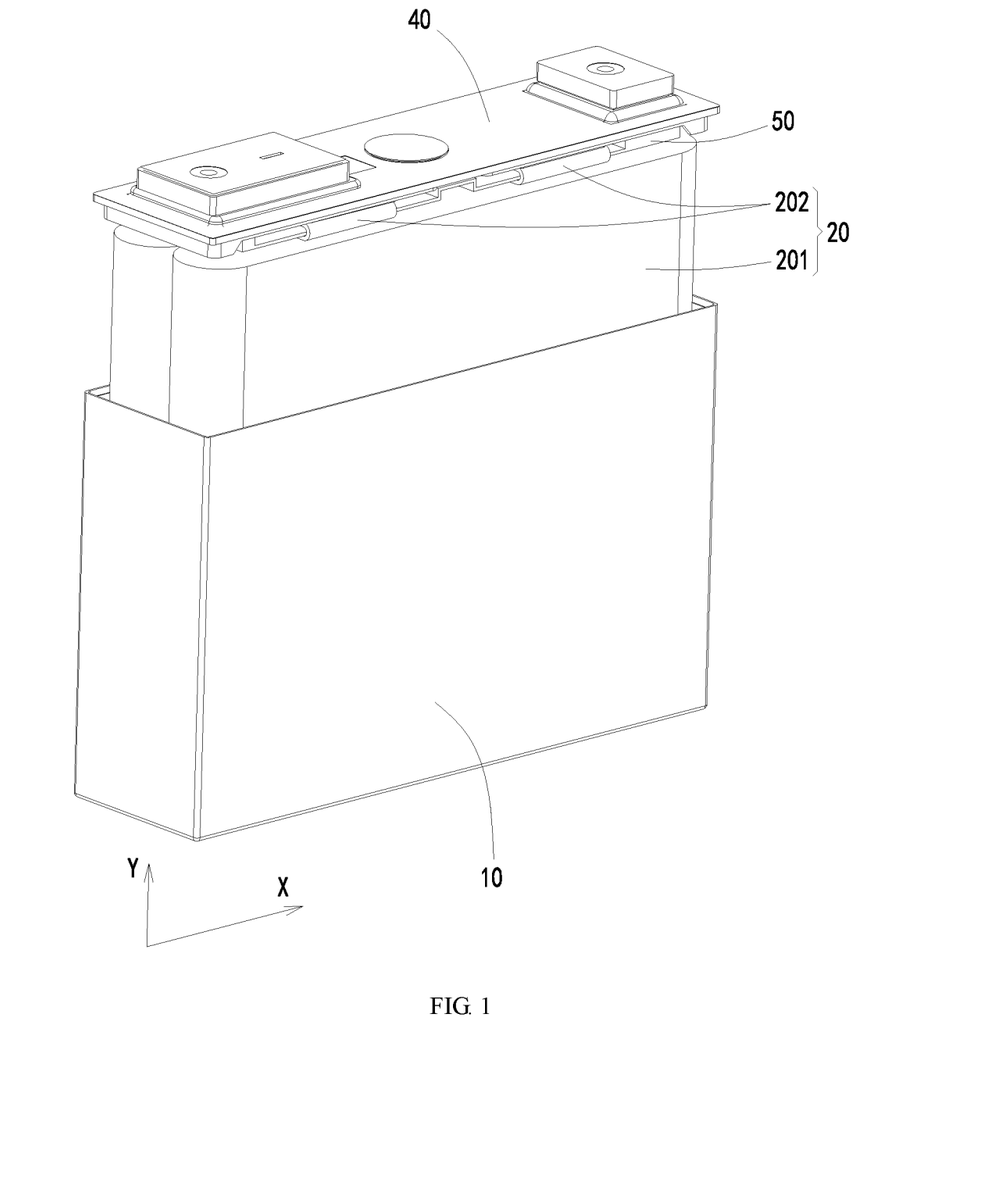
FIG. 1 is an exploded schematic view of a secondary battery according to an embodiment of the present disclosure.

As shown in FIG. 1, a secondary battery of an embodiment of the present disclosure includes a case 10, an electrode assembly 20 provided in the case 10, and a top cover assembly 40 hermetically connected with the case 10.

The case 10 of the embodiment may have a hexahedron shape or other shape. The case 10 of the embodiment has an internal space in which the electrode assembly 20 and the electrolyte are accommodated. The case 10 of the embodiment may be made of material such as aluminum or aluminum alloy.

Figure 2:
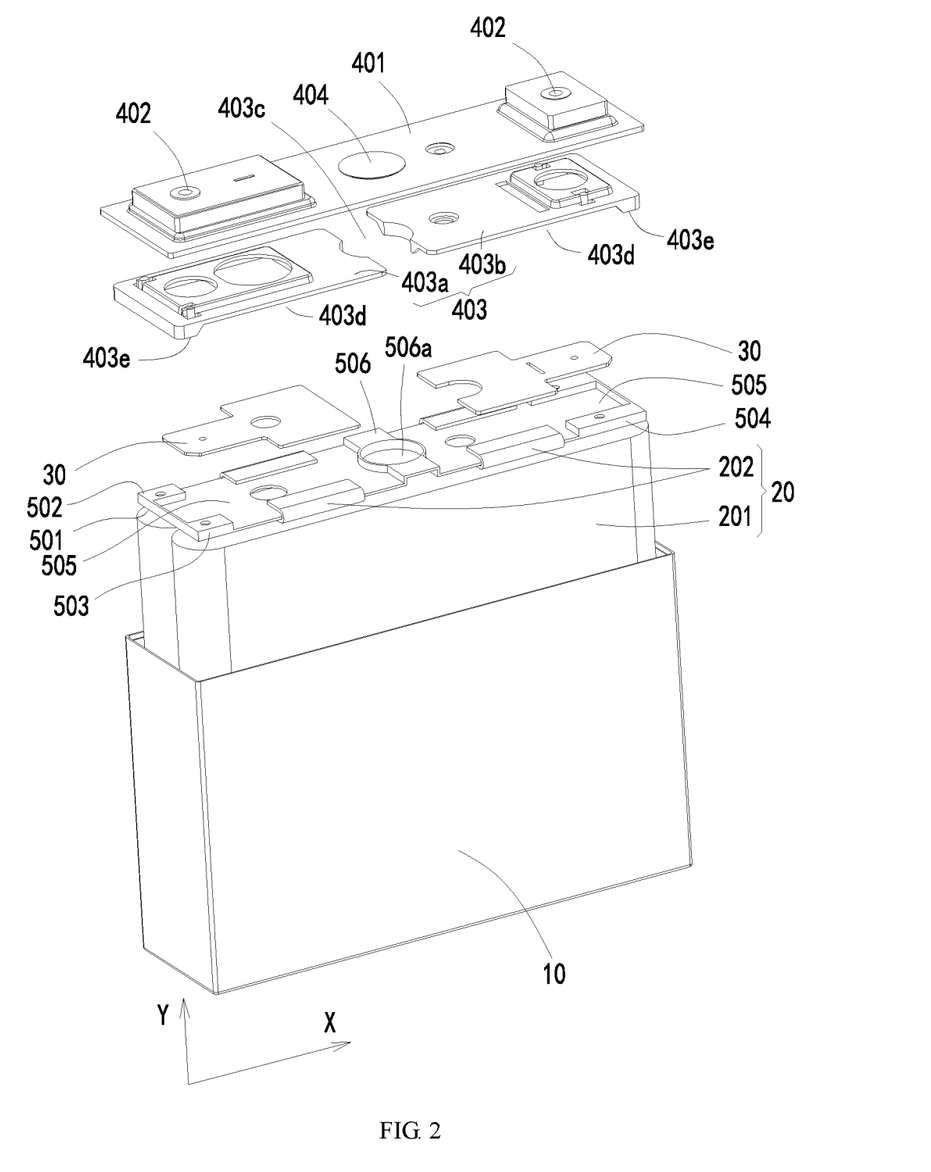
FIG. 2 is an exploded schematic view of a secondary battery according to another embodiment of the present disclosure.

With reference to FIG. 2, the electrode assembly 20 of the embodiment includes a main body portion 201 and electrode tabs 202 connected with the main body portion 201. In the embodiment, the main body portion 201 is formed by spirally winding the first electrode sheet, the second electrode sheet, and the isolating film together about a winding axis. The isolating film is an insulator interposed between the first electrode sheet and the second electrode sheet.

Figure 4:
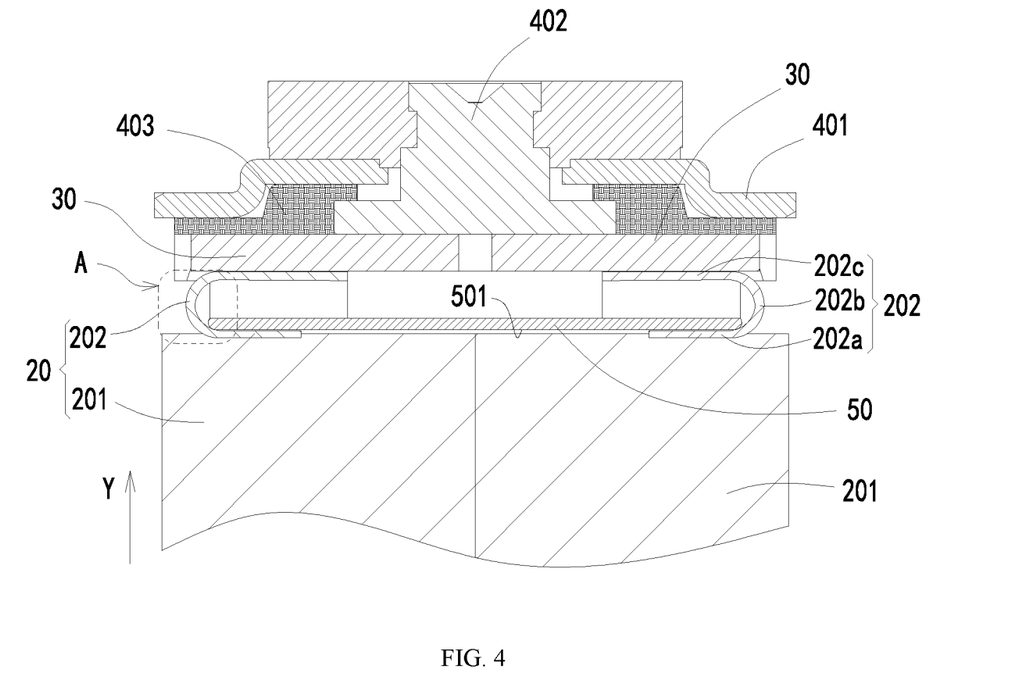
FIG. 4 is a partial cross-sectional schematic view of a secondary battery according to an embodiment of the present disclosure.
Figure 5:
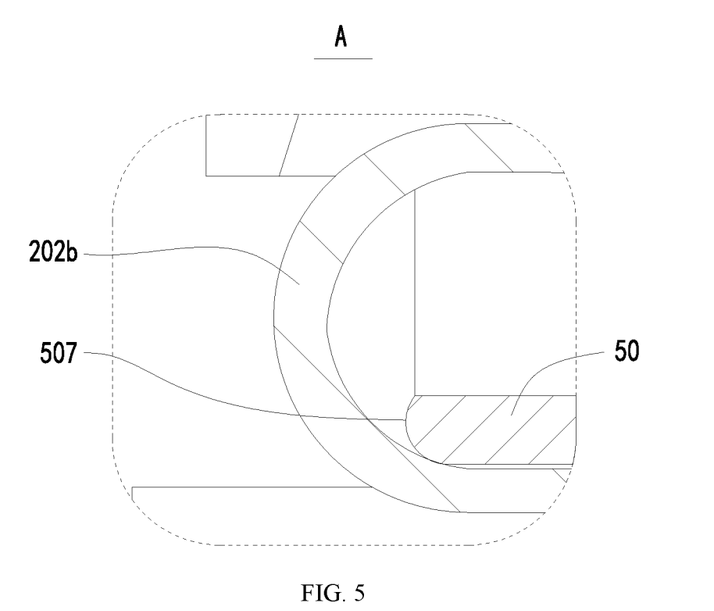
FIG. 5 is a partially enlarged view of A in FIG. 4.

The whole electrode assembly 20 of the embodiment has a flat structure which has a predetermined thickness, height, and width. In the embodiment, a situation that the first electrode sheet is a positive electrode sheet and the second electrode sheet is a negative electrode sheet is explained exemplarily. Similarly, in the other embodiment, the first electrode sheet may be a negative electrode sheet, and the second electrode sheet may be a positive electrode sheet. Moreover, an active material of the positive electrode sheet is coated on a coated region of the positive electrode sheet, and an active material of the negative electrode sheet is coated on a coated region of the negative electrode sheet. A plurality of uncoated regions extending from the coated regions of the main body portion 201 are stacked to form electrode tabs 202, and the electrode assembly 20 includes two electrode tabs 202, namely, a positive electrode tab extending from the coated region of the positive electrode sheet and a negative electrode tab extending from the coated region of the negative electrode sheet. With reference to FIG. 4, the electrode tabs 202 of the embodiment each includes a connecting end portion 202a, a welding end portion 202c, and a middle section 202b for connecting the connecting end portion 202a and the welding end portion 202c. The connecting end portion 202a included in the electrode tab 202 is connected with the main body portion 201.

The top cover assembly 40 of the embodiment of the present disclosure includes a top cover sheet 401, electrode terminals 402, and an insulating separator 403. The top cover sheet 401 of the embodiment is hermetically connected with the case 10, so as to seal the electrode assembly 20 inside the case 10. The top cover sheet 401 of the embodiment includes an explosion-proof valve 404. When the internal pressure of the secondary battery is excessive, the explosion-proof valve 404 can burst, so as to release the internal pressure and reduce the possibility of explosion of the secondary battery. The top cover sheet 401 of the embodiment has electrode outgoing holes. The electrode terminals 402 of the embodiment are provided on the top cover sheet 401 and corresponding to the electrode outgoing holes. The electrode tabs 202 included in the electrode assembly 20 are electrically connected with the electrode terminals 402. In one example, the welding end portion 202c of the electrode tab 202 may be directly connected with the corresponding electrode terminal 402 by welding. In another example, the secondary battery further includes an adapter sheet. The welding end portion 202c of the electrode tab 202 is connected with the adapter sheet by welding, so that the welding end portion 202c of the electrode tab 202 is connected with the corresponding electrode terminal 402 through the adapter sheet. The top cover sheet 401 of the embodiment is made of conductive material. The insulating separator 403 is used to isolate the top cover sheet 401 to the electrode assembly 20, so as to prevent direct contact between them.

The secondary battery of the embodiment further includes a top pressing plate 50. The top pressing plate 50 is provided between the insulating separator 403 and the main body portion 201. The top pressing plate 50 includes a first surface 501 facing the main body portion 201, a second surface 502 facing the insulating separator 403, and an accommodating groove 505 recessed from the second surface 502 toward the first surface 501. The welding end portion 202c of the electrode tab 202 is located between the top pressing plate 50 and the insulating separator 403 and accommodated in the accommodating groove 505. When the main body portion 201 moves, the connecting portion between the electrode tabs 202 and the main body portion 201 will be frequently bent or stretched, which may easily lead to breakage of the electrode tab 202. In the embodiment, after the secondary battery is assembled, the top pressing plate 50 can exert predetermined pressure on the main body portion 201 of the electrode assembly 20 to limit the up and down movements of the electrode assembly 20, so that when the whole secondary battery vibrates, the up and down movements of the main body portion 201 of the electrode assembly 20 inside the case 10 can be reduced to a certain extent and thus the electrode tabs 202 of the electrode assembly 20 will not be frequently bent or broken, thereby effectively improving the use safety of the secondary battery.

In the secondary battery of the embodiment of the present disclosure, since the top pressing plate 50 is provided between the insulating separator 403 and the main body portion 201 of the electrode assembly 20, the electrode assembly 20 is fixed by the top pressing plate 50, so as to ensure the stability of the position of the electrode assembly 20 inside the case 10 and reduce the possibility of breakage of the electrode tabs 202 which is caused due to the movement of the main body portion 201, thereby improving the use safety of the secondary battery. Moreover, the accommodating groove 505 having an accommodating function is provided on the top pressing plate 50. At least a portion of the welding end portion 202c of the electrode tab 202 is accommodated in the accommodating groove 505, and in this way, on the one hand, in a thickness direction Y of the top cover sheet 401, the thickness of both the welding end portion 202c and the top pressing plate 50 is small, so as to effectively save the internal space of the case 10 and increasing the energy density of the secondary battery; on the other hand, the welding end portion 202c of the electrode tab 202 is connected with the electrode terminal 402 or the adapter sheet by welding, and when welding slag is generated in the welding region during assembly or use of the secondary battery, the welding slag can be collected by the accommodating groove 505 of the top pressing plate 50, so as to effectively prevent the welding slag from falling onto the main body portion 201 and thus effectively reduce the possibility of the welding slag piercing into the electrode sheets or the isolating film included in the main body portion 201, thereby improving the safety of the secondary battery; furthermore, the welding region of the welding end portion 202c is physically isolated to the main body portion 201 by the top pressing plate 50 of the embodiment. During assembly or use of the secondary battery, the welding region will not contact the main body portion 201, so as to reduce the possibility of damage to the main body portion 201 which is caused due to scratch or abrasion by the welding region, thereby improving the use safety of the secondary battery; finally, if no accommodating groove 505 is provided, i.e., the second surface 502 of the top pressing plate 50 is a flat surface, the welding end portion 202c presses against both ends of the top pressing plate 50 and the middle portion of the top pressing plate 50 is suspended. When the whole secondary battery vibrates, the main body portion 201 will exert upward force on the top pressing plate 50, and at this time, both ends of the top pressing plate 50 are warped, thereby affecting the stability of the top pressing plate 50.

Figure 3:
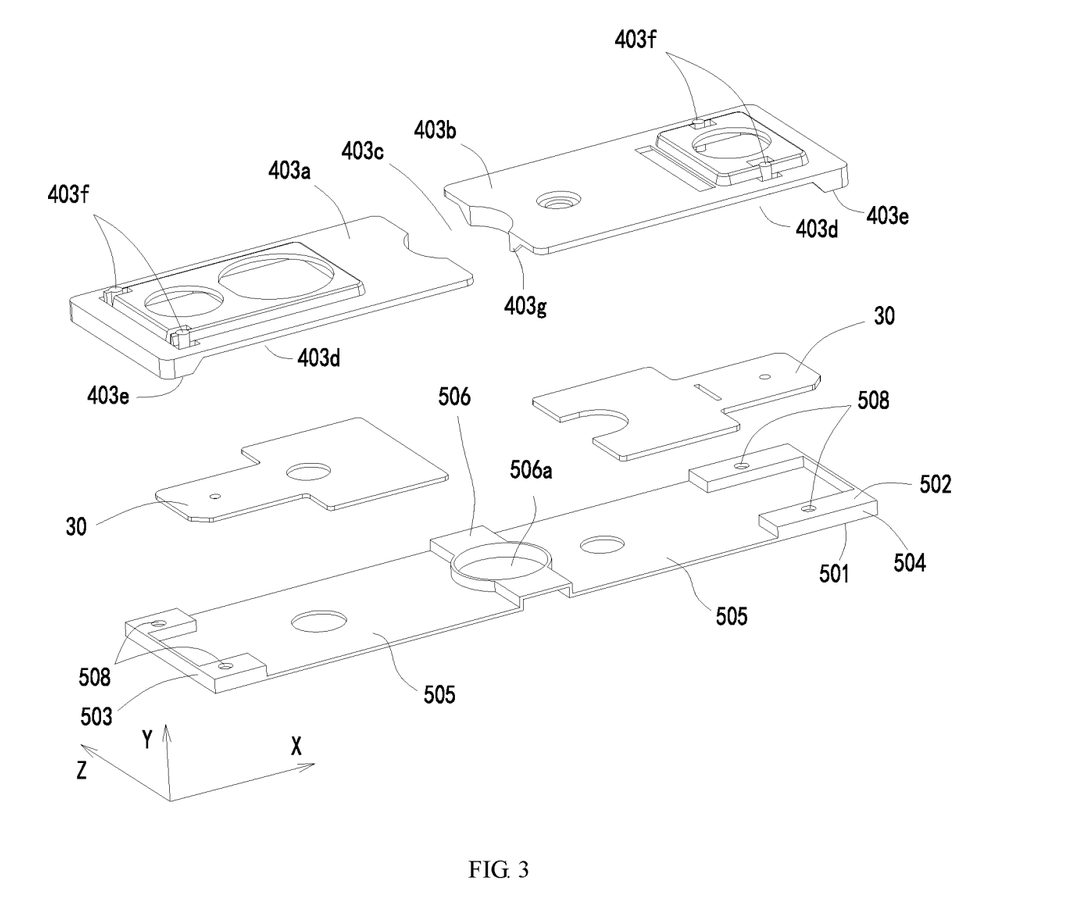
FIG. 3 is an exploded schematic view of an insulating separator, an adapter sheet, and a top pressing plate according to an embodiment of the present disclosure.

In one embodiment, with reference to FIG. 2 or FIG. 3, the secondary battery includes an adapter sheet 30. The adapter sheet 30 of the embodiment has a flat plate shape, so as to occupy less space in the thickness direction Y and thus make the structure more compact. The welding end portion 202c of the electrode tab 202 is connected with the adapter sheet 30 by welding. The adapter sheet 30 are at least partially accommodated in the accommodating groove 505. In the thickness direction Y of the top cover sheet 401, the adapter sheet 30, the welding end portion 202c of the electrode tab 202, and the top pressing plate 50 are compact in structure, so as to effectively save the internal space of the case 10 and thus increase the energy density of the secondary battery.

The insulating separator 403 of the embodiment includes an accommodating recess 403d recessed away from the main body portion 201. The top pressing plate 50 and the welding end portion 202c are both accommodated in the accommodating recess 403d. In the thickness direction Y of the top cover sheet 401, the insulating separator 403, the welding end portion 202c of the electrode tab 202, and the top pressing plate 50 are compact in structure, so as to further save the internal space of the case 10 and thus effectively increase the energy density of the secondary battery. In one embodiment, the second surface 502 of the top pressing plate 50 abuts against a bottom of the accommodating recess 403d. There is no gap for moving between the top pressing plate 50 and the insulating separator 403, so that the top pressing plate 50 is subject to clamping force between the insulating separator 403 and the main body portion 201 and thus its own position is more stable, thereby ensuring that the position of the main body portion 201 is stable and is not easy to move. In one embodiment, the secondary battery includes an adapter sheet 30. The welding end portion 202c is connected with the corresponding electrode terminals 402 through the adapter sheet 30. The welding end portion 202c is located between the adapter sheet 30 and the top pressing plate 50. The top pressing plate 50, the welding end portion 202c, and the adapter sheet 30 are all accommodated in the accommodating recess 403d.

In the embodiment where the top pressing plate 50 and the welding end portion 202c are both accommodated in the accommodating recess 403d, the first surface 501 of the top pressing plate 50 protrudes beyond a lower surface 403e of the insulating separator 403 facing the main body portion 201 so that the lower surface 403e of the insulating separator 403 will not contact the main body portion 201, thereby reducing the possibility that the main body portion 201 is damaged which is caused due to excessive pressure stress on a part of the main body portion 201 by the insulating separator 403.

As shown in FIG. 3, the top pressing plate 50 of the embodiment includes a first engaging portion 508. The insulating separator 403 includes a second engaging portion 403f. The first engaging portion 508 of the top pressing plate 50 and the second engaging portion 403f of the insulating separator 403 are engaged with each other, so that the top pressing plate 50 and the insulating separator 403 are connected and fixed fast and conveniently. During connection of them, the first engaging portion 508 and the second engaging portion 403f can be positioned relative to each other, so as to reduce the difficulty of their connection, realize rapid assembly, and also ensure the stability of the position of the top pressing plate 50 during installation. The top pressing plate 50 is not easy to wobble in a length direction X of the top cover sheet 401 to scratch the welding end portion 202c. In one embodiment, the first engaging portion 508 is an engaging hole, and the second engaging portion 403f is an engaging leg. It is easily understood that the first engaging portion 508 may be an engaging leg, and the second engaging portion 403f may be an engaging hole.

As shown in FIG. 4, in the thickness direction Y, at least a portion of the connecting end portion 202a of the electrode tab 202 of the embodiment is located below the top pressing plate 50, the middle sections 202b bypasses the top pressing plate 50, and the welding end portion 202c are located in the accommodating groove 505. In one embodiment, with reference to FIG. 5, in a width direction of the top pressing plate 50, the accommodating groove 505 included in the top pressing plate 50 of the embodiment penetrates the top pressing plate 50. In the embodiment, the width direction of the top pressing plate 50 is the same as a width direction Z of the top cover sheet 401. The top pressing plate 50 of the embodiment includes two side surfaces 507 facing each other in the width direction Z. The accommodating groove 505 penetrates from one side surface 507 to the other side surface 507 to form a through groove. In one example, the number of the electrode assembly 20 is two. The two electrode assemblies 20 are provided side by side in the width direction Z. In this way, the electrode tabs 202 of one electrode assembly 20 bypass the top pressing plate 50 from one side of the top pressing plate 50 and the welding end portion 202c included therein are located in the accommodating groove 505, while the electrode tabs 202 of the other electrode assembly 20 bypass the top pressing plate 50 from the other side of the top pressing plate 50 and the welding end portion 202c included therein are located in the accommodating groove 505. In one embodiment, the side surfaces 507 have an arc shape, so that when the middle sections 202b of the electrode tabs 202 bypass the top pressing plate 50, the contact regions between the corresponding side surfaces 507 and middle sections are large and fit well, thereby reducing the possibility of damage of the middle sections 202b which is caused due to extrusion or scratch by the side of the top pressing plate 50.

With reference to FIG. 2 or FIG. 3, in the thickness direction Y, the depth of the accommodating groove 505 of the embodiment is greater than or equal to the thickness of the welding end portion 202c. The whole welding end portion 202c is accommodated in the accommodating groove 505. In this way, on the one hand, the total thickness value of both the welding end portion 202c and the top pressing plate 50 are further reduced and thus the occupation rate of the internal space of the case 10 is lowered, thereby further increasing the energy density of the secondary battery; on the other hand, after assembly of the secondary battery, the insulating separator 403 is in direct contact with and thus supported by the top pressing plate 50, so that the insulating separator 403 will not exert compression force on the welding end portion 202c.

With reference to FIG. 2 or FIG. 3, the top pressing plate 50 of the embodiment includes a first end portion 503, a second end portion 504, and a first boss 506. The first end portion 503 and the second end portion 504 are provided oppositely in a length direction of the top pressing plate 50. The length direction of the top pressing plate 50 is the same as the length direction X of the top cover sheet 401. The first boss 506 is provided between the first end portion 503 and the second end portion 504 and located in the middle of the top pressing plate 50. The number of the accommodating groove 505 is two. The two accommodating grooves 505 are respectively provided on both sides of the first boss 506 in the length direction X. When the number of the electrode assembly 20 is one, one electrode tab 202 of the electrode assembly 20 is provided in one accommodating groove 505, and the other electrode tab 202 is provided in the other accommodating groove 505. The first boss 506 separates the two electrode tabs 202. When the number of the electrode assembly 20 is two, the two electrode tabs 202 of each electrode assembly 20 are positioned corresponding to the two accommodating grooves 505, so that the two electrode tabs 202 of the two electrode assemblies 20 are simultaneously accommodated in the corresponding accommodating grooves 505. On each side of the first boss 506, two electrode tabs 202 are provided. In the thickness direction Y, the thickness of the middle portion of the top pressing plate 50 in which the first boss 506 is provided is larger than a portion of the top pressing plate 50 in which the accommodating grooves 505 are provided. Therefore, the middle portion of the top pressing plate 50 in which the first boss 506 is provided has a large rigidity and thus is not easy to be bent and deformed under force, thereby reducing the possibility of damage of the main body portion 201 which is caused due to excessive pressure stress on the main body portions 202 under bending of the middle portion of the top pressing plate 50.

In one embodiment, with reference to FIG. 2 or FIG. 3, the insulating separator 403 includes a first insulator 403a and a second insulator 403b. The first insulator 403a and the second insulator 403b are provided at intervals in the length direction X. An avoidance gap 403c is formed between the first insulator 403a and the second insulator 403b. The first boss 506 of the top pressing plate 50 is provided corresponding to the avoidance gap 403c. The top cover sheet 401 includes an explosion-proof valve 404 which is provided corresponding to the avoidance gap 403c. The first boss 506 is provided with an overflow hole 506a corresponding to the avoidance gap 403c. When the internal pressure of the secondary battery is excessive, the explosion-proof valve 404 is open, and the airflow can be discharged smoothly and quickly through the overflow hole 506a, the avoidance gap 403c, and the opened explosion-proof valve 404. In one example, after assembly of the secondary battery, a part of the first boss 506 can be inserted into the avoidance gap 403c, so as to further save the internal space of the case 10 and thus increase the energy density of the secondary battery.

Figure 6:
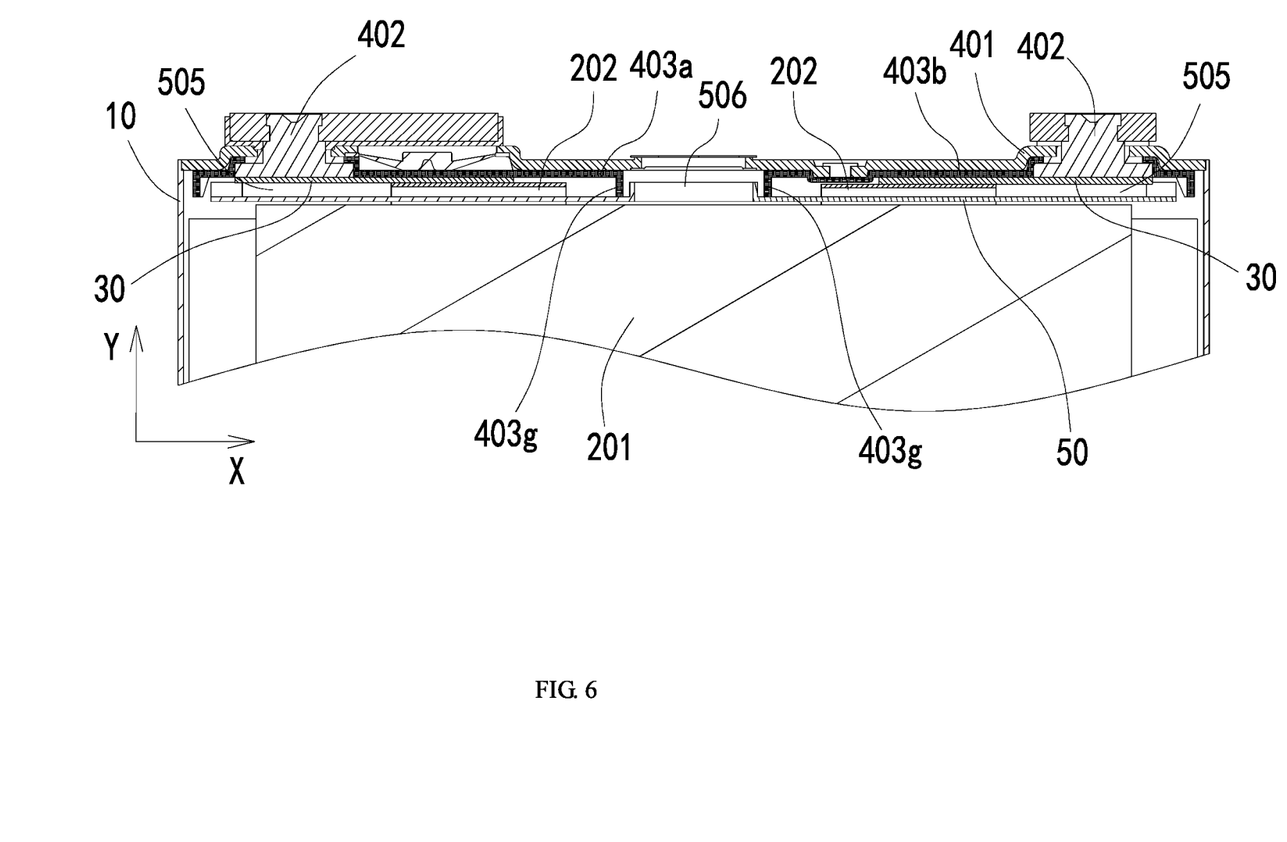
FIG. 6 is a partial cross-sectional schematic view of a secondary battery according to another embodiment of the present disclosure.

With reference to FIG. 3 or FIG. 6, the first insulator 403a and the second insulator 403b of the embodiment each includes a second boss 403g. The second bosses 403g abut against the bottom of the accommodating grooves 505. The top pressing plate 50 is supported by the second bosses 403g, and in this way, on the one hand, the first insulator 403a and the second insulator 403b are prevented from moving easily which is caused due to the gap between the first insulator 403a and second insulator 403b and the top pressing plate 50; on the other hand, the top pressing plate 50 is prevented from warping toward the top cover sheet 401 by the insulating separator 403, so that the first surface 501 of the top pressing plate 50 and the main body portion 201 fit well and the pressure stress exerted on the main body portion 201 is maintained in a balanced state. In the thickness direction Y, the thickness of the second bosses 403g is greater than or equal to the depth of the accommodating groove 505, so that the second bosses 403g can be pressed against the bottom of the accommodating groove 505. In one example, the insulating separator 403 and the top pressing plate 50 are engaged with each other through the first engaging portion 508 and the second engaging portion 403f. The second bosses 403g and the connecting portion formed by the first engaging portion 508 and the second engaging portion 403f form two kinds of fulcrums, so as to effectively improve the stability of position of the insulating separator 403.

In the secondary battery of the embodiment of the present disclosure, the top pressing plate 50 is provided between the top cover sheet 401 and the main body portion 201 of the electrode assembly 20. The top pressing plate 50 can press against the main body portion 201, so as to limit the position of the main body portion 201 in the case, effectively restrain the movement of the main body portion 201 in the case 10 and further prevent the electrode tabs 202 from being bent and broken which is caused due to the movement of the main body portion 201, thereby improving the use safety of the secondary battery. The welding end portion 202c of the electrode tab 202 can be isolated to the main body portion 201 by the top pressing plate 50, so as to prevent the welding region of the welding end portion 202c from scratching or abrading the main body portion 201. Moreover, the top pressing plate 50 of the embodiment includes the accommodating groove 505. The middle sections 202b of the electrode tabs 202 bypass the top pressing plate 50, so that the welding end portion 202c is located in the accommodating groove 505 and thus the welding end portion 202c and the top pressing plate 50 have smaller stacking thickness in the thickness direction Y of the top cover sheet 401, thereby saving the internal space of the case 10 and thus increasing of the energy density of the secondary battery.

Figure 7:
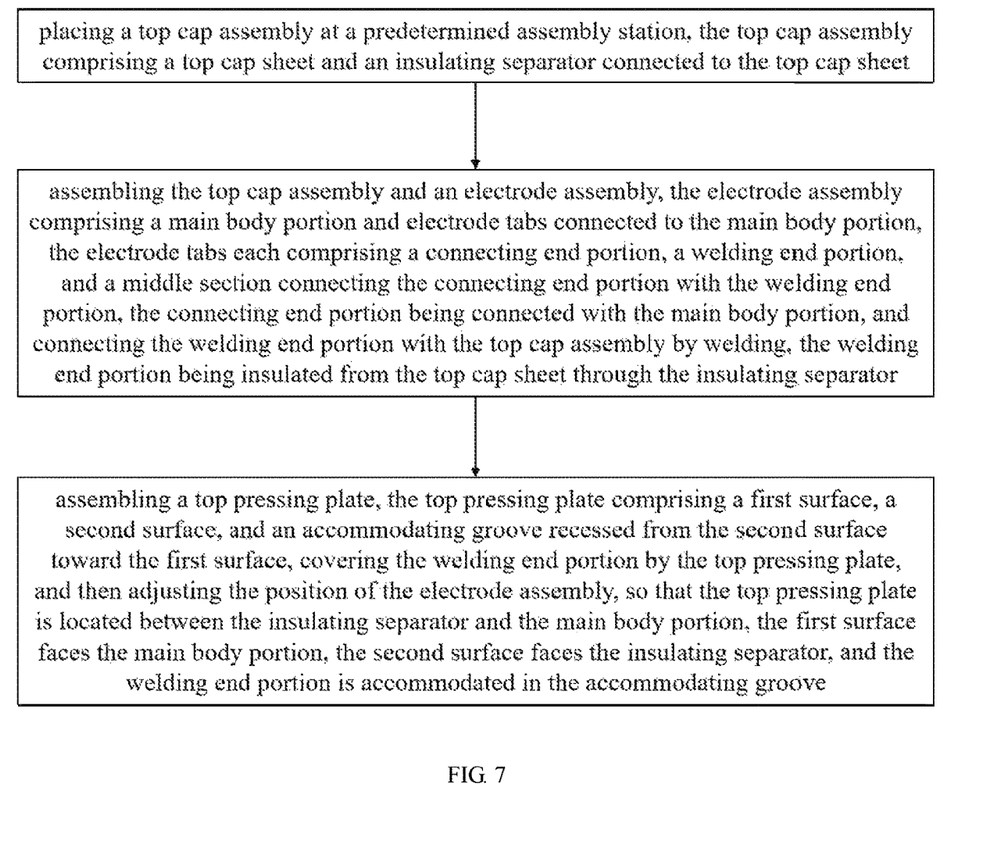
FIG. 7 is a flowchart of a method for manufacturing a secondary battery according to an embodiment of the present disclosure.

With reference to FIG. 7, an embodiment of the present disclosure provides a method for manufacturing a secondary battery, the method including:

placing a top cover assembly 40 at a predetermined assembly station, the top cover assembly 40 including a top cover sheet 401 and an insulating separator 403 connected to the top cover sheet 401;

assembling the top cover assembly 40 and an electrode assembly 20, the electrode assembly 20 including a main body portion 201 and electrode tabs 202 connected to the main body portion 201, the electrode tabs 202 each including a connecting end portion 202a, a welding end portion 202c, and a middle section 202b connecting the connecting end portion 202a and the welding end portion 202b, the connecting end portion 202a being connected with the main body portion 201, and connecting the welding end portion 202c with the top cover assembly 40 by welding, the welding end portion 202c being insulated from the top cover sheet 401 through the insulating separator 403; and assembling a top pressing plate 50, the top pressing plate 50 including a first surface 501, a second surface 502, and an accommodating groove 505 recessed from the second surface 502 toward the first surface 501, covering the welding end portion 202c by the top pressing plate 50, and then adjusting the position of the electrode assembly 20, so that the top pressing plate 50 is located between the insulating separator 403 and the main body portion 201, the first surface 501 faces the main body portion 201, the second surface 502 faces the insulating separator 403, and the welding end portion 202c is accommodated in the accommodating groove 505.

Although the present disclosure has been described with reference to the preferred embodiments, various modifications may be made thereto and the components thereof may be replaced with equivalents without departing from the scope of the present disclosure. In particular, the technical features mentioned in the various embodiments may be combined in any manner as long as there is no structural conflict. The present disclosure is not limited to the specific embodiments disclosed herein, but includes all technical solutions falling within the scope of the claims.

What is claimed is:

1. A top pressing plate, which is used for a secondary battery, the secondary battery comprising a top cover sheet, an insulating separator connected to the top cover sheet, and an electrode assembly, the electrode assembly comprising a main body portion and electrode tabs connected to the main body portion, the electrode tabs each comprising a welding end portion, wherein the top pressing plate comprises:

a first surface and a second surface provided oppositely in a thickness direction of the top pressing plate and an accommodating groove recessed from the second surface toward the first surface, the top pressing plate can be provided between the insulating separator and the main body portion, the first surface faces the main body portion, the second surface faces the insulating separator, and the accommodating groove is disposed to accommodate the welding end portion, the top pressing plate comprises a first boss, the insulating separator comprises a first insulator and a second insulator, the first insulator and the second insulator are spaced apart in a length direction of the top pressing plate so as to form an avoiding gap, the first boss is arranged corresponding to the avoiding gap, each of the first insulator and the second insulator has an accommodating recess recessed away from the main body portion and a second boss protruding toward the main body portion, the accommodating recess comprises a bottom away from the main body portion, the top pressing plate and the welded end portion are both accommodated in the accommodating recess, and the second surface of the top pressing plate abuts the bottom of the accommodating recess away from the main body portion and the second boss of each of the first insulator and the second insulator abuts against the bottom of the accommodating groove at the middle position of the top pressing plate so that there is no gap for moving between the top pressing plate and the insulating separator.

2. The top pressing plate according to claim 1, wherein the accommodating groove penetrates the top pressing plate in a width direction of the top pressing plate.

3. The top pressing plate according to claim 1, wherein the number of the accommodating grooves is two, and two accommodating grooves are respectively provided on both sides of the first boss in the length direction of the top pressing plate.

4. A secondary battery, comprising:

an electrode assembly, the electrode assembly comprising a main body portion and electrode tabs connected to the main body portion, the electrode tabs each comprising a connecting end portion, a welding end portion, and a middle section connecting the connecting end portion and the welding end portion, the connecting end portion being connected to the main body portion;

a top cover assembly, the top cover assembly comprising a top cover sheet and an insulating separator connected to the top cover sheet; and a top pressing plate, the top pressing plate provided between the insulating separator and the main body portion, the top pressing plate comprising a first surface facing the main body portion, a second surface facing the insulating separator, and an accommodating groove recessed from the second surface toward the first surface, the welding end portion being accommodated in the accommodating groove, wherein the top pressing plate comprises a first boss, the insulating separator comprises a first insulator and a second insulator, the first insulator and the second insulator are spaced apart in a length direction of the top pressing plate so as to form an avoiding gap, the first boss is arranged corresponding to the avoiding gap, each of the first insulator and the second insulator has an accommodating recess recessed away from the main body portion and a second boss protruding toward the main body portion, the accommodating recess comprises a bottom away from the main body portion, the top pressing plate and the welded end portion are both accommodated in the accommodating recess, and the second surface of the top pressing plate abuts the bottom of the accommodating recess away from the main body portion and the second boss of each of the first insulator and the second insulator abuts against the bottom of the accommodating groove at the middle position of the top pressing plate so that there is no gap for moving between the top pressing plate and the insulating separator.

5. The secondary battery according to claim 4, wherein the accommodating groove penetrates the top pressing plate in a width direction of the top cover sheet.

6. The secondary battery according to claim 4, wherein a depth of the accommodating groove is greater than or equal to a thickness of the welding end portion in a thickness direction of the top cover sheet.

7. The secondary battery according to claim 4, wherein the number of the accommodating groove is two, and two accommodating grooves are respectively provided on both sides of the first boss in the length direction of the top cover sheet.

8. The secondary battery according to claim 4, wherein a thickness of the second boss is greater than or equal to the depth of corresponding one of the two accommodating grooves.

9. The secondary battery according to claim 7, wherein the top cover assembly further comprises an explosion-proof valve, the explosion-proof valve provided on the top cover sheet and corresponding to the first boss, the first boss comprising an overflow hole corresponding to the explosion-proof valve.

10. The secondary battery according to claim 4, wherein the secondary battery further comprises an adapter sheet, the adapter sheet has a flat plate shape, the welding end portion is connected with the adapter sheet by welding, and the adapter sheet is at least partially accommodated in the accommodating groove.

11. The secondary battery according to claim 4, wherein the top pressing plate comprises a first engaging portion, the insulating separator comprises a second engaging portion, and the first engaging portion is engaged with the second engaging portion, and wherein one of the first engage portion and the second engaging portion is an engaging hole, and the other thereof is an engaging leg.

12. A method for manufacturing a secondary battery, comprising:

placing a top cover assembly at a predetermined assembly station, the top cover assembly comprising a top cover sheet and an insulating separator connected to the top cover sheet;

assembling the top cover assembly and an electrode assembly, the electrode assembly comprising a main body portion and electrode tabs connected to the main body portion, the electrode tabs each comprising a connecting end portion, a welding end portion, and a middle section connecting the connecting end portion and the welding end portion, the connecting end portion being connected with the main body portion, and connecting the welding end portion with the top cover assembly by welding, the welding end portion being insulated from the top cover sheet through the insulating separator; and assembling a top pressing plate, the top pressing plate comprising a first surface, a second surface, and an accommodating groove recessed from the second surface toward the first surface, covering the welding end portion by the top pressing plate, and then adjusting the position of the electrode assembly, so that the top pressing plate is located between the insulating separator and the main body portion, the first surface faces the main body portion, the second surface faces the insulating separator, and the welding end portion is accommodated in the accommodating groove, wherein the top pressing plate comprises a first boss, the insulating separator comprises a first insulator and a second insulator, the first insulator and the second insulator are spaced apart in a length direction of the top pressing plate so as to form an avoiding gap, the first boss is arranged corresponding to the avoiding gap, each of the first insulator and the second insulator has an accommodating recess recessed away from the main body portion and a second boss protruding toward the main body portion, the accommodating recess comprises a bottom away from the main body portion, the top pressing plate and the welded end portion are both accommodated in the accommodating recess, and the second surface of the top pressing plate abuts the bottom of the accommodating recess away from the main body portion and the second boss of each of the first insulator and the second insulator abuts against the bottom of the accommodating groove at the middle position of the top pressing plate so that there is no gap for moving between the top pressing plate and the insulating separator.

13. The secondary battery according to claim 5, wherein the number of the accommodating groove is two, and two accommodating grooves are respectively provided on both sides of the first boss in the length direction of the top cover sheet.

14. The secondary battery according to claim 6, wherein the number of the accommodating groove is two, and two accommodating grooves are respectively provided on both sides of the first boss in the length direction of the top cover sheet.

15. The secondary battery according to claim 5, wherein the secondary battery further comprises an adapter sheet, the adapter sheet has a flat plate shape, the welding end portion is connected with the adapter sheet by welding, and the adapter sheet is at least partially accommodated in the accommodating groove.

16. The secondary battery according to claim 6, wherein the secondary battery further comprises an adapter sheet, the adapter sheet has a flat plate shape, the welding end portion is connected with the adapter sheet by welding, and the adapter sheet is at least partially accommodated in the accommodating groove.

* * * * *